US012175696B2

(12) United States Patent
Zhang et al.

(10) Patent No.: US 12,175,696 B2
(45) Date of Patent: Dec. 24, 2024

(54) METHOD AND APPARATUS WITH OBJECT INFORMATION ESTIMATION AND VIRTUAL OBJECT GENERATION

(71) Applicant: Samsung Electronics Co., Ltd., Suwon-si (KR)

(72) Inventors: Chao Zhang, Beijing (CN); Weiming Li, Beijing (CN); Qiang Wang, Beijing (CN); Sunghoon Hong, Hwaseong-si (KR); Wooshik Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 766 days.

(21) Appl. No.: 17/146,895

(22) Filed: Jan. 12, 2021

(65) Prior Publication Data
US 2021/0217194 A1 Jul. 15, 2021

(30) Foreign Application Priority Data

Jan. 13, 2020 (CN) .................. 202010033125.X
Nov. 30, 2020 (KR) .................. 10-2020-0165002

(51) Int. Cl.
*G06K 9/00* (2022.01)
*G06N 3/045* (2023.01)
(Continued)

(52) U.S. Cl.
CPC .............. *G06T 7/70* (2017.01); *G06N 3/045* (2023.01); *G06T 7/73* (2017.01); *G06T 19/006* (2013.01);
(Continued)

(58) Field of Classification Search
CPC .............. G06T 7/73; G06T 7/70; G06N 3/045
See application file for complete search history.

(56) References Cited

U.S. PATENT DOCUMENTS 9,530,250 B2 * 12/2016 Mazula .................. G06T 19/006
10,157,502 B2   12/2018 Montgomerie et al.
(Continued)

FOREIGN PATENT DOCUMENTS

CN          110390340 A  * 10/2019 ............. G06K 9/468
KR   10-2010-0003252 A     1/2010
(Continued)

OTHER PUBLICATIONS

Y. Li, W. Ouyang, B. Zhou, K. Wang and X. Wang, "Scene Graph Generation from Objects, Phrases and Region Captions," 2017 IEEE International Conference on Computer Vision (ICCV), Venice, Italy, 2017, pp. 1270-1279, doi: 10.1109/ICCV.2017.142. (Year: 2017).*

(Continued)

*Primary Examiner* — Emily C Terrell
*Assistant Examiner* — Aidan Keup
(74) *Attorney, Agent, or Firm* — NSIP Law

(57) ABSTRACT

An electronic device for estimating object information and generating a virtual object and a method of operating the electronic device are disclosed. The method includes obtaining an image, obtaining a class feature, a pose feature, and a relationship feature of an object included in the image, correcting each of the class feature, the pose feature, and the relationship feature using any combination of any two or more of the class feature, the pose feature, and the relationship feature of the object, and obtaining class information, pose information, and relationship information of the object based on the corrected class feature, the corrected pose feature, and the corrected relationship feature, respectively.

25 Claims, 15 Drawing Sheets

(51) Int. Cl.
*G06T 7/70* (2017.01)
*G06T 7/73* (2017.01)
*G06T 19/00* (2011.01)
*G06T 19/20* (2011.01)
*G06V 10/44* (2022.01)
*G06V 10/764* (2022.01)
*G06V 20/10* (2022.01)

(52) U.S. Cl.
CPC ............ *G06T 19/20* (2013.01); *G06V 10/454* (2022.01); *G06V 10/764* (2022.01); *G06V 20/10* (2022.01); *G06T 2219/2016* (2013.01)

(56) References Cited

U.S. PATENT DOCUMENTS

| | | | | |
|---|---|---|---|---|
| 10,719,993 | B1* | 7/2020 | Ha | G06V 10/25 |
| 11,034,018 | B2* | 6/2021 | Kusano | G03B 17/42 396/389 |
| 11,126,845 | B1* | 9/2021 | Chaturvedi | G06F 3/011 |
| 2018/0322674 | A1 | 11/2018 | Du | |
| 2019/0199993 | A1 | 6/2019 | Babu J D et al. | |
| 2020/0074672 | A1* | 3/2020 | Hoff | G06T 19/006 |
| 2020/0160538 | A1* | 5/2020 | Daniel | G06T 7/248 |
| 2020/0193619 | A1* | 6/2020 | Danielsson | G06T 7/248 |

FOREIGN PATENT DOCUMENTS

| | | |
|---|---|---|
| KR | 10-2015-0067741 A | 6/2015 |
| KR | 10-1543287 B1 | 8/2015 |
| KR | 10-1865655 B1 | 6/2018 |
| KR | 10-2018-0110051 A | 10/2018 |
| KR | 10-2019-0062102 A | 6/2019 |
| WO | WO-2019138834 A1 * | 7/2019 |

OTHER PUBLICATIONS

Wang, Chen, et al. "Densefusion: 6d object pose estimation by iterative dense fusion." Proceedings of the IEEE/CVF conference on computer vision and pattern recognition. 2019. (Year: 2019).*
Li, Y. L., Zhou, S., Huang, X., Xu, L., Ma, Z., Fang, H. S., . . . & Lu, C. (2019). Transferable interactiveness knowledge for human-object interaction detection. In Proceedings of the IEEE/CVF Conference on Computer Vision and Pattern Recognition (pp. 3585-3594). (Year: 2019).*
Li, Yikang, et al. "Scene graph generation from objects, phrases and region captions." *Proceedings of the IEEE International Conference on Computer Vision.* 2017. (10 pages in English).
Huang, Siyuan, et al. "Cooperative holistic scene understanding: Unifying 3d object, layout, and camera pose estimation." *Advances in Neural Information Processing Systems.* 2018. (12 pages in English).
Huang, Siyuan, et al. "Holistic 3d scene parsing and reconstruction from a single rgb image." *Proceedings of the European Conference on Computer Vision* (ECCV). 2018. (17 pages in English).
Wang, Chen, et al. "Densefusion: 6d object pose estimation by iterative dense fusion." *Proceedings of the IEEE Conference on Computer Vision and Pattern Recognition.* 2019. (10 pages in English).

* cited by examiner

Local region

Full image

METHOD AND APPARATUS WITH OBJECT INFORMATION ESTIMATION AND VIRTUAL OBJECT GENERATION

CROSS-REFERENCE TO RELATED APPLICATIONS

This application claims the benefit under 35 USC § 119 (a) of Chinese Patent Application No. 202010033125.X filed on Jan. 13, 2020, in the China National Intellectual Property Administration and Korean Patent Application No. 10-2020-0165002 filed on Nov. 30, 2020, in the Korean Intellectual Property Office, the entire disclosures of which are incorporated herein by reference for all purposes.

BACKGROUND

1. Field

The following description relates to a method and apparatus with object information estimation and virtual object generation.

2. Description of Related Art

Object detection is a technology for recognizing various objects in an input image. As part of an effort to improve the accuracy in recognizing objects, there is a desire to detect an object included in an image using full image information of the image.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method of operating an electronic device includes obtaining an image, obtaining a class feature, a pose feature, and a relationship feature of an object included in the image, correcting each of the class feature, the pose feature, and the relationship feature using any combination of any two or more of the class feature, the pose feature, and the relationship feature of the object, and obtaining class information, pose information, and relationship information of the object based on the corrected class feature, the corrected pose feature, and the corrected relationship feature, respectively.

The correcting may include correcting one of the class feature, the pose feature, and the relationship feature by applying a preset weight to each of the class feature, the pose feature, and the relationship feature of the object.

The obtaining of the class feature, the pose feature, and the relationship feature may include obtaining the class feature, the pose feature, and the relationship feature from respective intermediate layers of sub-networks of a neural network respectively corresponding to the class feature, the pose feature, and the relationship feature.

The intermediate layers of the sub-networks may be connected to one another, and the class feature, the pose feature, and the relationship feature may be shared by the sub-networks that are different from one another.

When the corrected class feature, the corrected pose feature, and the corrected relationship feature are input to respective subsequent layers of the intermediate layers of the sub-networks of a neural network, the obtaining of the class information, the pose information, and the relationship information of the object may include obtaining the class information, the pose information, and the relationship information from respective output layers of the sub-networks.

The class information may include information as to which object is detected in the image. The pose information may include information indicating a rotation angle of an object detected in the image. The relationship information may include action information associated with either one or both an action of an object detected in the image and connection information associated with a connection with another object.

The method may further include determining virtual position information, virtual pose information, and virtual action information of a virtual object to be generated in the image based on the class information, the pose information, and the relationship information of the object, and adding the virtual object to the image based on the virtual position information, the virtual pose information, and the virtual action information.

When at least one of the virtual position information, the virtual pose information, or the virtual action information determined for the virtual object is a plurality of sets of information, the adding of the virtual object may include adding the virtual object to the image based on information selected by a user from among the sets of information.

The virtual position information may include information indicating a position at which the virtual object is available to be rendered in the image. The virtual pose information may include information indicating a rotation angle of the virtual object. The virtual action information may include information indicating an action of the virtual object.

The image may be a red-green-blue (RGB) depth (D) (RGB-D) image.

A non-transitory computer-readable storage medium may store instructions that, when executed by one or more processors, configure the one or more processors to perform the method above.

In another general aspect, an electronic device includes one or more processors. The processors may obtain an image, obtain a class feature, a pose feature, and a relationship feature of an object included in the image, correct each of the class feature, the pose feature, and the relationship feature using any combination of any two or more of the class feature, the pose feature, and the relationship feature of the object, and obtain class information, pose information, and relationship information of the object based on the corrected class feature, the corrected pose feature, and the corrected relationship feature, respectively.

The one or more processors may be configured to correct one of the class feature, the pose feature, and the relationship feature by applying a preset weight to each of the class feature, the pose feature, and the relationship feature of the object.

The one or more processors may be configured to obtain the class feature, the pose feature, and the relationship feature from respective intermediate layers of sub-networks of a neural network respectively corresponding to the class feature, the pose feature, and the relationship feature.

The intermediate layers of the sub-networks may be connected to one another, and the class feature, the pose feature, and the relationship feature may be shared by the sub-networks that are different from one another.

The processors may be configured to, when the corrected class feature, the corrected pose feature, and the corrected relationship feature are input to respective subsequent layers of respective intermediate layers of sub-networks of a neural network respectively corresponding to the corrected class feature, the corrected pose feature, and the corrected relationship feature, obtain the class information, the pose information, and the relationship information from respective output layers of the corresponding sub-networks.

The class information may include information as to which object is detected in the image. The pose information may include information indicating a rotation angle of an object detected in the image. The relationship information may include action information associated with either one or both of an action of an object detected in the image and connection information associated with a connection with another object.

The processors may be configured to determine virtual position information, virtual pose information, and virtual action information of a virtual object to be generated in the image based on the class information, the pose information, and the relationship information of the object; and add the virtual object to the image based on the virtual position information, the virtual pose information, and the virtual action information.

The one or more processors may be configured to, when at least one of the virtual position information, the virtual pose information, or the virtual action information determined is a plurality of sets of information, add the virtual object to the image based on information selected by a user from among the sets of information.

The virtual position information may include information indicating a position at which the virtual object is available to be rendered in the image. The virtual pose information may include information indicating a rotation angle of the virtual object. The virtual action information may include information indicating an action of the virtual object.

Other features and aspects will be apparent from the following detailed description, the drawings, and the claims.

Figure 1:
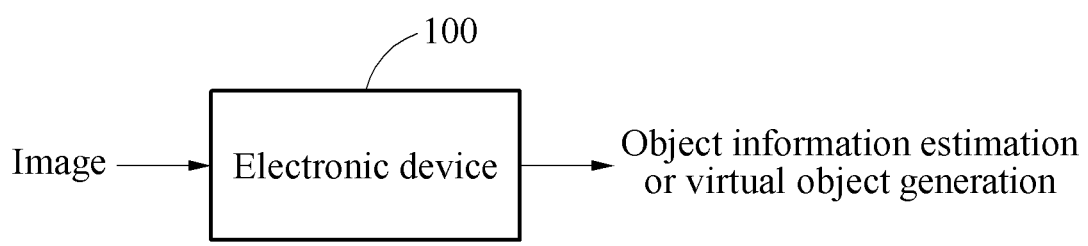
FIG. 1 illustrates an example of an operation of an electronic device.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein.

Also, in the description of example embodiments, detailed description of structures or functions that are thereby known after an understanding of the disclosure of the present application will be omitted when it is deemed that such description will cause ambiguous interpretation of the example embodiments. Hereinafter, examples will be described in detail with reference to the accompanying drawings, and like reference numerals in the drawings refer to like elements throughout.

FIG. 1 illustrates an example of an operation of an electronic device.

Figure 2:
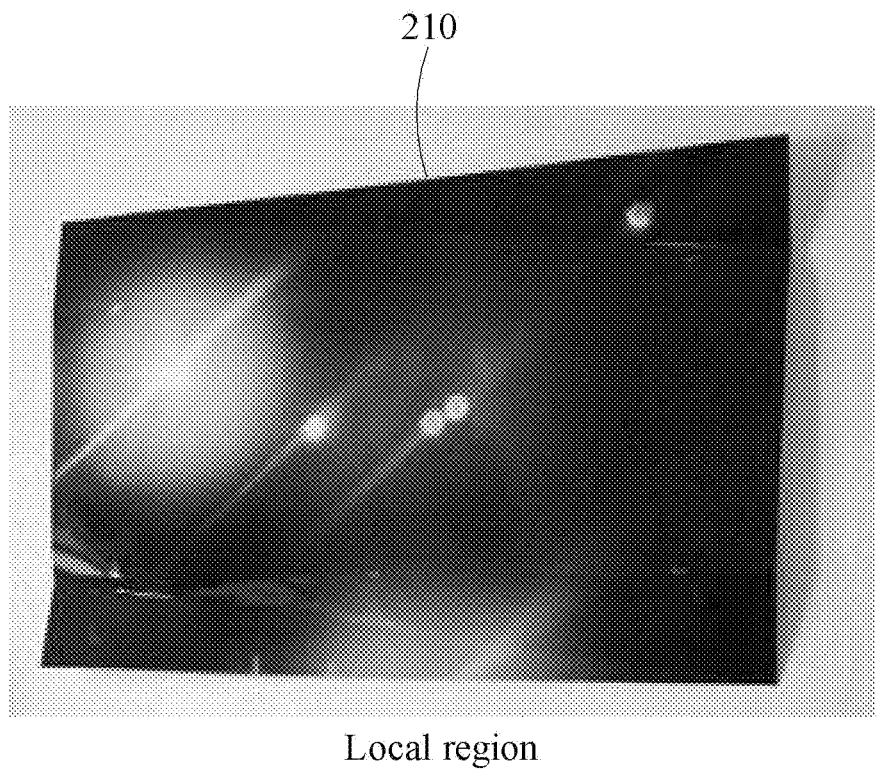
FIGS. 2 through 4 illustrate examples of recognizing an object based on a full image.
Figure 3:
Figure 3:
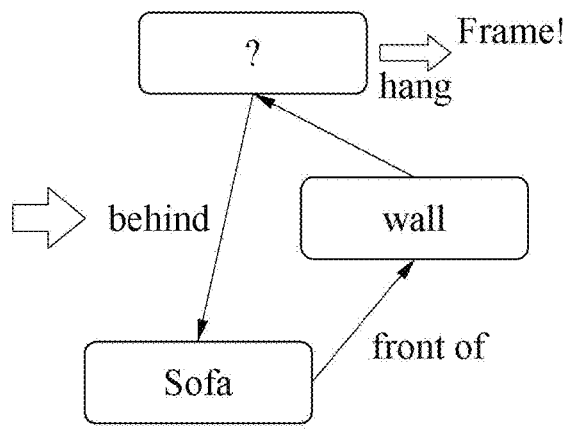
Figure 4:
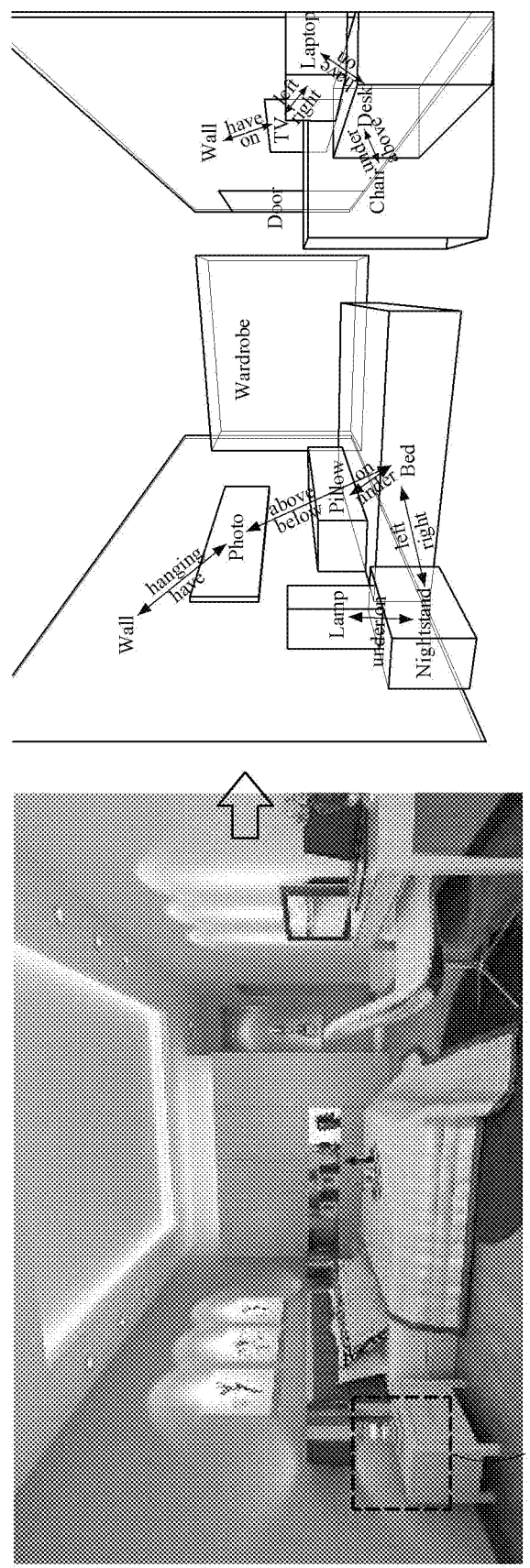

Referring to FIG. 1, an electronic device 100 may detect an object included in an image, and estimate object information of the detected object or generate a virtual object in the image based on the estimated object information. The image described herein may be obtained by capturing an image of one or more objects included in a scene, and be a red-green-blue (RGB) depth (D) (RGB-D) image in which a color image and a depth image are included. For example, the image may be an image captured by a camera embedded in the electronic device 100 or an image received from an external camera device. The object information estimated by the electronic device 100 may include class information, pose information, and relationship information of an object included in the image. The relationship information may be information associated with a relationship of an object with another object. The relationship information may be represented as a scene graph. The scene graph may be represented by a matrix of a size of N×N, in which N denotes the number of recognized objects. In the matrix, each row and each column correspond to each object, and each element corresponds to a relationship between objects. In addition, the electronic device 100 may generate a virtual object that is suitable for one or more objects included in an image based on at least one of class information, pose information, and relationship information of the objects. Herein, it is noted that use of the term 'may' with respect to an example or embodiment, e.g., as to what an example or embodiment may include or implement, means that at least one example or embodiment exists where such a feature is included or implemented while all examples and embodiments are not limited thereto. FIGS. 2 through 4 illustrate examples of recognizing an object based on a full image.

FIG. 2 illustrates an object 210 disposed in a local region of an image. In some cases, there may be different types of objects having similar shapes, or there may be an object occluded by another object. In such cases, it may not be easy to accurately estimate information of a particular object only using a local region. In the example of FIG. 2, for example, it may not be easy to accurately recognize whether the detected object 210 is a television (TV) or a picture frame, based solely on the local region. However, by considering a full image as illustrated in FIG. 3, it is possible to recognize an object 310 detected in the full image more accurately by analyzing a relationship between objects included in the full image. For example, using information indicating that the object 310, which is an object a user desires to estimate, is hung on a wall and behind a sofa, it is possible to readily recognize the object 310 as a picture frame and not a TV.

FIG. 4 illustrates another example of estimating a detected object 410 based on a full image. By considering that the object 410 is disposed on a left side of a bed and under a lamp, it is possible to readily recognize the object 410 as a nightstand. As described in the foregoing, based on a relationship between objects included in a full image, it is possible to improve the accuracy in object detection.

Figure 5:
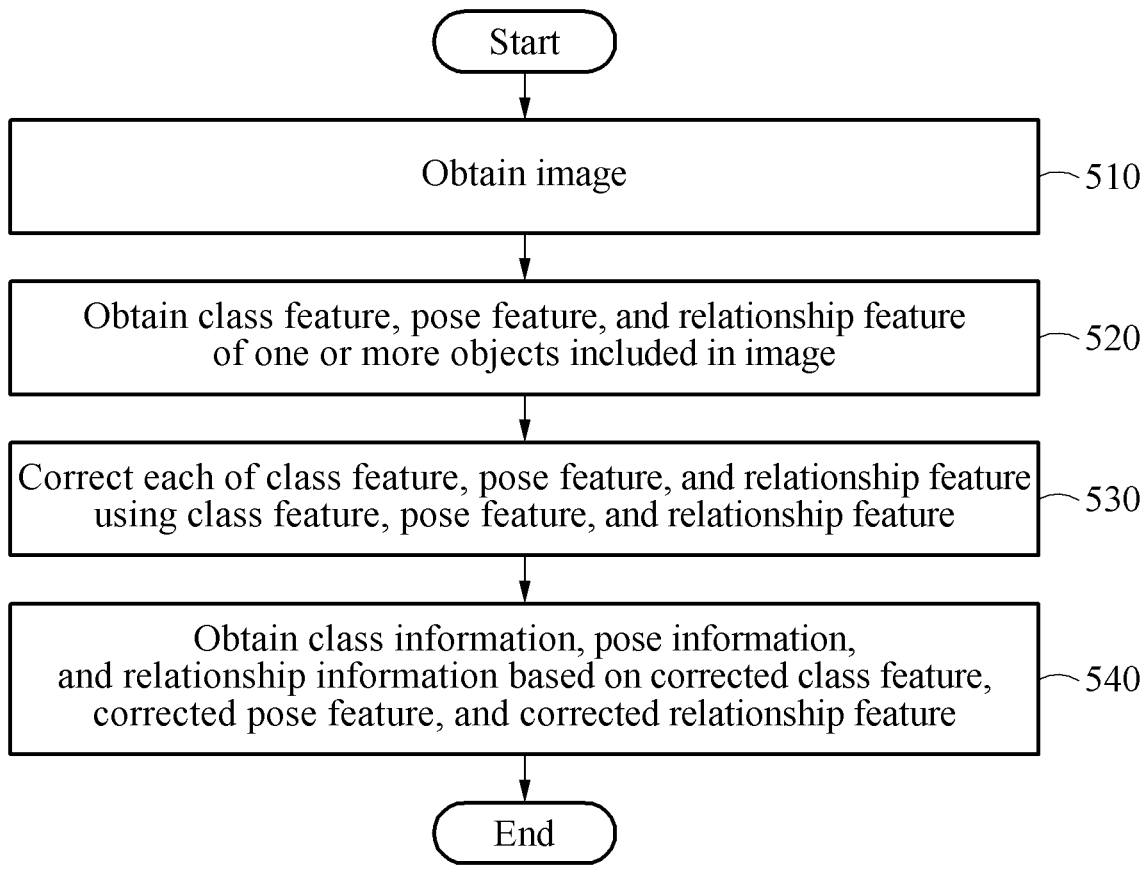
FIG. 5 illustrates an example of estimating information of an object included in an image by an electronic device.

FIG. 5 illustrates an example of estimating information of an object included in an image by an electronic device.

FIG. 5 is a flowchart illustrating an example of a method of estimating object information to be performed by a processor included in an electronic device. The electronic device may recognize a class, a pose, and a relationship of one or more objects included in an image using a plurality of sub-networks. Each of the sub-networks may include one or more convolutional layers and fully-connected layers.

Referring to FIG. 5, in operation 510, the electronic device obtains an image. The image may be a color image including depth information, for example, an RGB-D image. For example, the electronic device may obtain the image through a camera module embedded therein, or receive the image captured by an external camera device. Alternatively, the image may also be obtained from an image collecting device for an augmented reality (AR) device.

In operation 520, the electronic device obtains a class feature, a pose feature, and a relationship feature of one or more objects included in the image. The class feature may be a feature used to determine class information as to which object a detected object is. The pose feature may be a feature used to determine pose information indicating a rotation angle of an object in a target map. The relationship feature may be a feature used to determine relationship information, including action information associated with an action of a detected object or connection information associated with a connection with another object. For example, in a "person reading a book," "reading" may correspond to relationship information between the "person" and the "book." For another example, in a "picture hung on a wall," "hung on" may correspond to relationship information between the "picture" and the "wall."

The electronic device may input the image to a neural network, including a plurality of sub-networks. The sub-networks may include a class recognition network for recognizing the class information, a pose recognition network for recognizing the pose information, and a relationship recognition network for recognizing the relationship information. The class feature, the pose feature, and the relationship feature may be output from respective intermediate layers of the sub-networks. Here, an intermediate layer may be one of one or more hidden layers included in a sub-network.

In operation 530, the electronic device corrects each of the class feature, the pose feature, and the relationship feature of the objects using the class feature, the pose feature, and the relationship feature of the one or more objects included in the image. The sub-networks may join together with one another, and may thus exchange features output from the intermediate layers of the sub-networks. For example, the electronic device may correct the class feature of a particular object using the class feature, the pose feature, and the relationship feature of the one or more objects included in the image. The electronic device may also correct the pose feature of a particular object using the class feature, the pose feature, and the relationship feature of the one or more objects included in the image. In addition, the electronic device may correct the relationship feature of a particular object using the class feature, the pose feature, and the relationship feature of the one or more objects included in the image.

In operation 540, the electronic device may obtain the class information based on the corrected class feature of the one or more objects included in the image, the pose information based on the corrected pose feature of the one or more objects included in the image, and the relationship information based on the corrected relationship feature of the one or more objects included in the image. By determining object information using such different types of features, it is possible to recognize object class information, object pose information, and object relationship information with a high level of accuracy based on a full image.

For the convenience of description, the class feature and the class information may also be referred to as a category feature and category information, respectively. In addition, the class information and the pose information may also be referred to as attribute information in a collective term.

Figure 6:
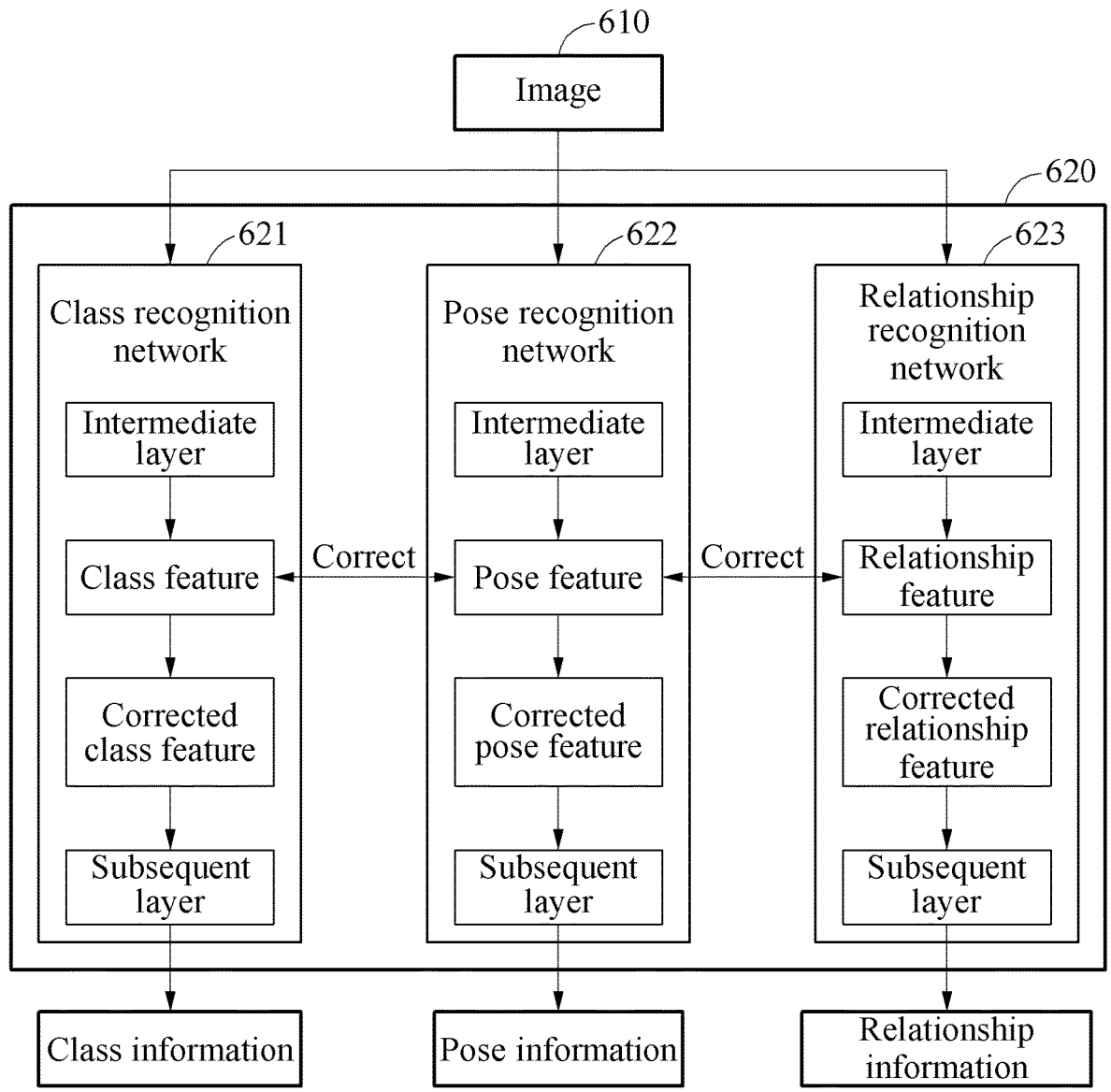
FIG. 6 illustrates an example of interactive correction based on sub-networks.

FIG. 6 illustrates an example of interactive correction based on sub-networks.

FIG. 6 illustrates an example of determining highly accurate object information by correcting features through data exchange among a plurality of sub-networks included in a neural network 620, for example, a class recognition network 621, a pose recognition network 622, and a relationship recognition network 623.

Referring to FIG. 6, an image 610 is input to the neural network 620, and recognition is then performed. The neural network 620 may include the class recognition network 621, the pose recognition network 622, and the relationship recognition network 623. From respective intermediate layers of the sub-networks 621, 622, and 623, a class feature, a pose feature, and a relationship feature may be output, respectively. The sub-networks 621, 622, and 623 may exchange data with one another, and through which the features may be corrected.

For example, the class feature output from the intermediate layer of the class recognition network 621 may be corrected using the pose feature output from the intermediate layer of the pose recognition network 622, and the relationship feature output from the intermediate layer of the relationship recognition network 623.

A more detailed description of correcting the class feature will follow. The corrected class feature may be obtained based on the class feature, the pose feature, and the relationship feature, and on a preset first weight coefficient array. The first weight coefficient array may include a weight coefficient of the class feature, a weight coefficient of the pose feature, and a weight coefficient of the relationship feature, which are used in a process of correcting the class feature.

By representing the first weight coefficient array as [$a_{11}$, $a_{12}$, $a_{13}$], the corrected class feature may be represented as follows.

$$\tilde{A}_1 = a_{11} \times A_1 + a_{12} \times A_2 + a_{13} \times A_3 \quad \text{Equation 1:}$$

In Equation 1 above, $A_1$, $A_2$, and $A_3$ denote a class feature, a pose feature, and a relationship feature, respectively. In addition, $a_{11}$, $a_{12}$, and $a_{13}$ denote a weight coefficient of the class feature applied to a correction process, a weight coefficient of the pose feature applied to the correction process, and a weight coefficient of the relationship feature applied to the correction process, respectively. $\tilde{A}_1$ denotes a corrected class feature.

Similarly, the corrected pose feature may be determined based on the class feature, the pose feature, and the relationship feature, and on a second weight coefficient array. In addition, the corrected relationship feature may be determined based on the class feature, the pose feature, and the relationship feature, and on a third weight coefficient array.

The first weight coefficient array, the second weight coefficient array, and the third weight coefficient array may be determined based on the level of importance of each of the class feature, the pose feature, and the relationship feature in correcting a corresponding feature.

As described above, through interactive correction of class, pose, and relationship features, the corrected class, pose, and relationship features may be obtained. Thus, it possible to improve the accuracy of class, pose, and relationship information of an object through a neural network. Here, even though interactive correction is performed on different features, parameters of respective sub-networks may not be changed.

As illustrated, the corrected class feature is input to a subsequent layer of the intermediate layer of the class recognition network 621 from which the class feature is output, and is then processed through remaining layers included in the class recognition network 621. Then, the class information is output from an output layer of the class recognition network 621. Similarly, the corrected pose feature is input to a subsequent layer of the intermediate layer of the pose recognition network 622, and is then processed through the remaining layers included in the pose recognition network 622. Then, the pose information is output from an output layer of the pose recognition network 622. In addition, the corrected relationship feature is input to a subsequent layer of the intermediate layer of the relationship recognition network 623, and is then processed through the remaining layers included in the relationship recognition network 623. Then, the relationship information is output from an output layer of the relationship recognition network 623.

Each of the class (or category) recognition network 621, the pose recognition network 622, and the relationship recognition network 623 may be embodied by a convolutional neural network (CNN), a faster region-based convolutional neural network (R-CNN), a 'you only look once: unified, real-time object detection' (Yolo), or the like. However, examples of which are not limited to the foregoing network types.

In an example, the neural network 620 may be trained based on a plurality of sample images. The sample images may be training data used to train the neural network 620, and include ground truth (or simply 'true') class information, true pose information, and true relationship information of one or more objects included in each of the images.

In this example, each of the sample images for which the true class information, the true pose information, and the true relationship information are set may be input to the neural network 620, and then inferred class information, inferred pose information, and inferred relationship information may be obtained from the neural network 620. Here, parameters of the neural network 620 may be adjusted based on a loss between the inferred class information and the true class information, a loss between the inferred pose information and the true pose information, and a loss between the inferred relationship information and the true relationship information. During the training, a weight parameter to be applied to the data exchange among the sub-networks 621, 622, and 623 may also be adjusted. By adjusting the parameters of the neural network 620 until each of the losses becomes less than a preset threshold value, the neural network 620 that is trained may be obtained.

By training the neural network 620 a preset number of times, it is possible to obtain such a trained recognition neural network 620. However, a method of training the neural network 620 is not limited to the foregoing.

Through joint training of the sub-networks 621, 622, and 623 for three tasks-object class recognition, object pose recognition, and object relationship recognition, it is possible to effectively improve the accuracy of information. For the data exchange among the sub-networks 621, 622, and 623, a gated message passing system may be applied, and recognition may be performed through feature refinement based on this application.

Figure 7:
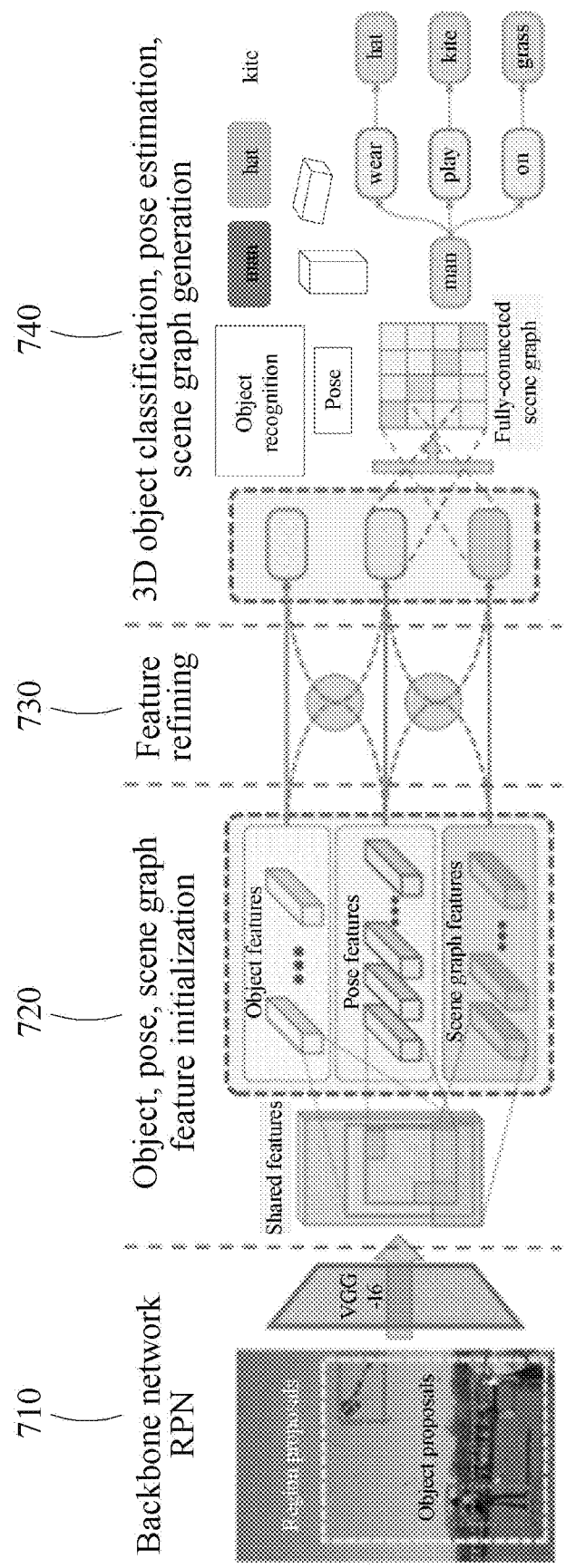
FIG. 7 illustrates an example of obtaining object information.

FIG. 7 illustrates an example of obtaining object information.

FIG. 7 illustrates an example of extracting object information from an input image.

Referring to FIG. 7, in operation 710, an image to be recognized is obtained, and an image feature is extracted based on a VGG16 network, and then a shared feature is obtained. The VGG16 network may be a convolutional network, including 16 convolutional layers and fully-connected layers. The VGG16 network may simplify the structure of a neural network. Based on a faster R-CNN, an object may be recognized from the shared feature, and a feature region may be obtained. The faster R-CNN may be a neural network including a region proposal network (RPN), a region of interest (RoI) pooling network, a classification network, and a regression network. However, examples of a network type used in a process for image feature extraction and shared feature-based recognition are not limited to the foregoing.

Based on the feature region, a candidate object region, a nearby candidate object region, and a related object pair region may be cropped. The candidate object region may be a region in the feature region in which an object is disposed. The nearby candidate object region may be a region around an object in the feature region. The related object pair region may be a region in which a pair of related objects is disposed in the feature region.

In operation 720, the object region, the nearby candidate object region, and the related object pair region, which are cropped and selected, are input to a class recognition network, and then an object class feature is obtained. In addition, they are input to a pose recognition network, and then an object pose feature is obtained. In addition, they are input to a relationship recognition network, and then an object relationship feature is obtained. For the convenience of description, the relationship feature may also be referred to as a scene graph feature.

In operation 730, through data exchange among the class recognition network, the pose recognition network, and the relationship recognition network, the class feature, the pose feature, and the relationship feature are corrected.

In operation 740, object class information is output from the class recognition network. For example, as illustrated, information associated with a human, a hat, and a kite may be output. In addition, object pose information is output from the pose recognition network. In addition, object relationship information is output from the relationship recognition network. For example, as illustrated, a scene graph indicating, for example, a human wearing a hat, a human playing with a kite, and a human standing on grass, may be output.

Figure 8:
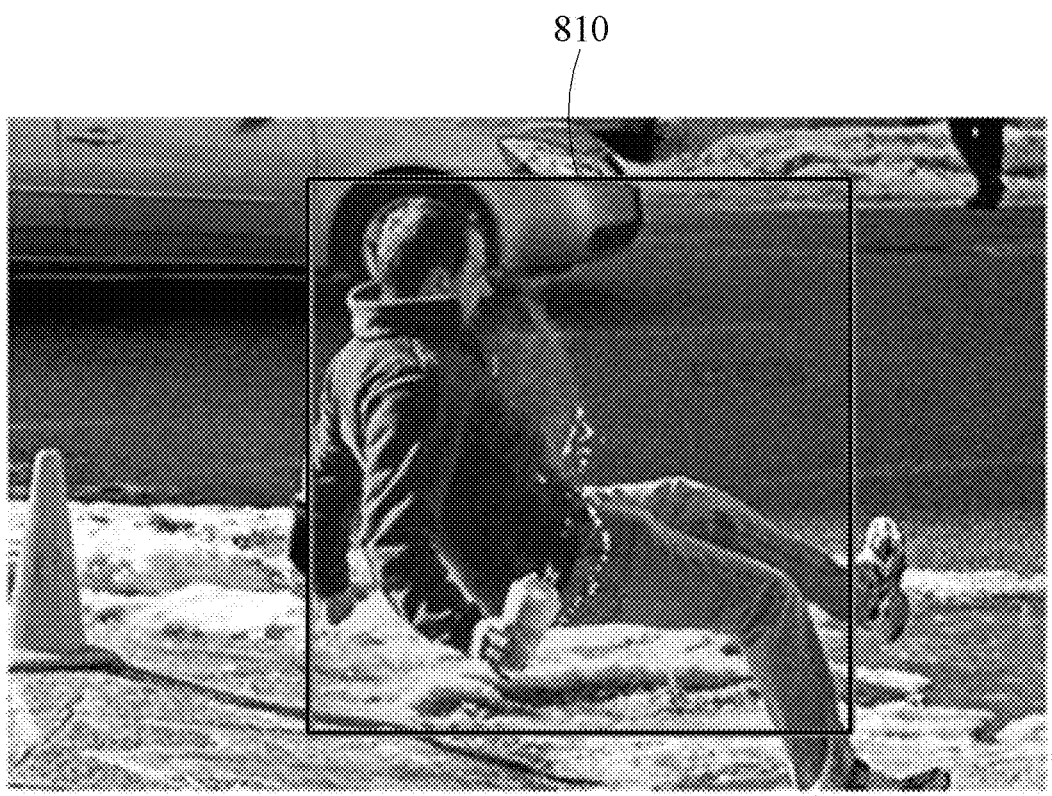
FIGS. 8 and 9 illustrate examples of obtained object information.
Figure 9:
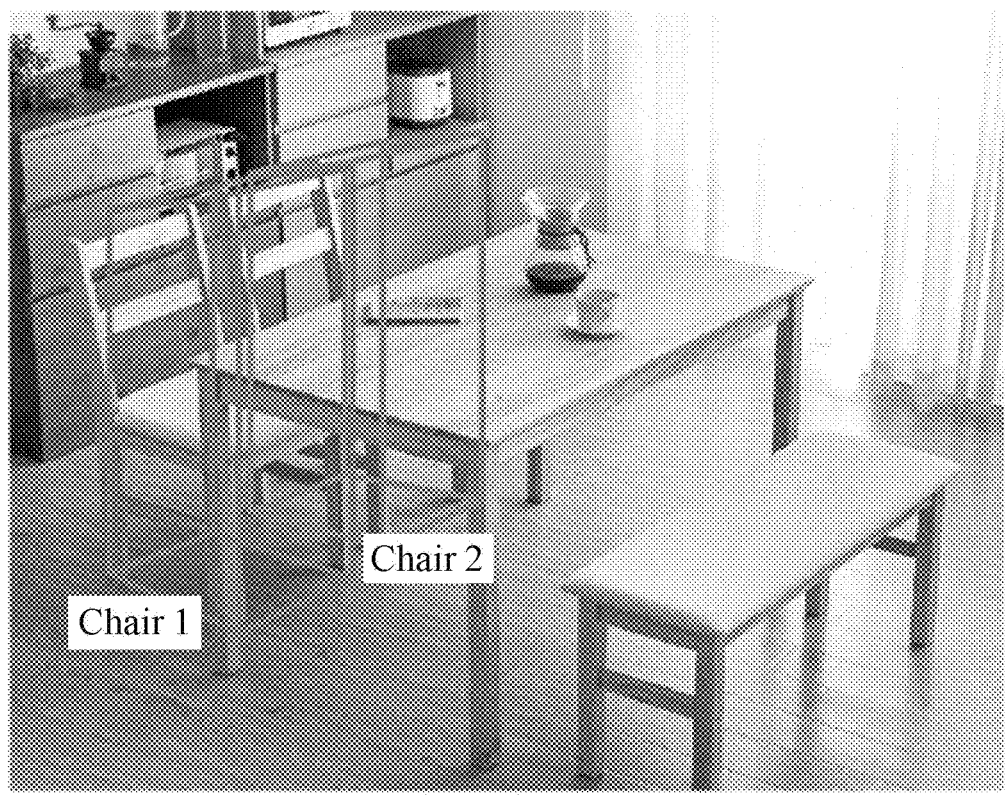

FIGS. 8 and 9 illustrate examples of obtained object information.

During recognition, a class recognition network, a pose recognition network, and a relationship recognition network may join together with one another to correct features, and thus object information associated with an object included in an input image may be recognized more accurately. The object information-based understanding of a three-dimensional (3D) scene, including object detection, pose estimation, and object relationship recognition, may enable the acquirement of information with a high level of accuracy maximally using a full scene and a relationship among objects. The recognized object information may be used in various fields, including, for example, smart home, autonomous driving, and security, in addition to an AR system.

In addition, the object information may be provided as necessary information to other applications. For example, as illustrated in FIG. 8, in a smart home, an event indicating, for example, a 'human 810-fell-floor,' may be recognized based on recognized object information, and a warning may be sounded to notify a user of such an event.

In addition, in a case in which a certain object is occluded by another object, a class and a pose of the occluded object may be better recognized using the information of an object around the occluded object. For example, as illustrated in FIG. 9, a great portion of chair 2 on the right side is occluded by a table in front and chair 1 on the left side. Using an object recognition method described above, it is possible to recognize class information and 3D pose information of the occluded object more accurately.

Figure 10:
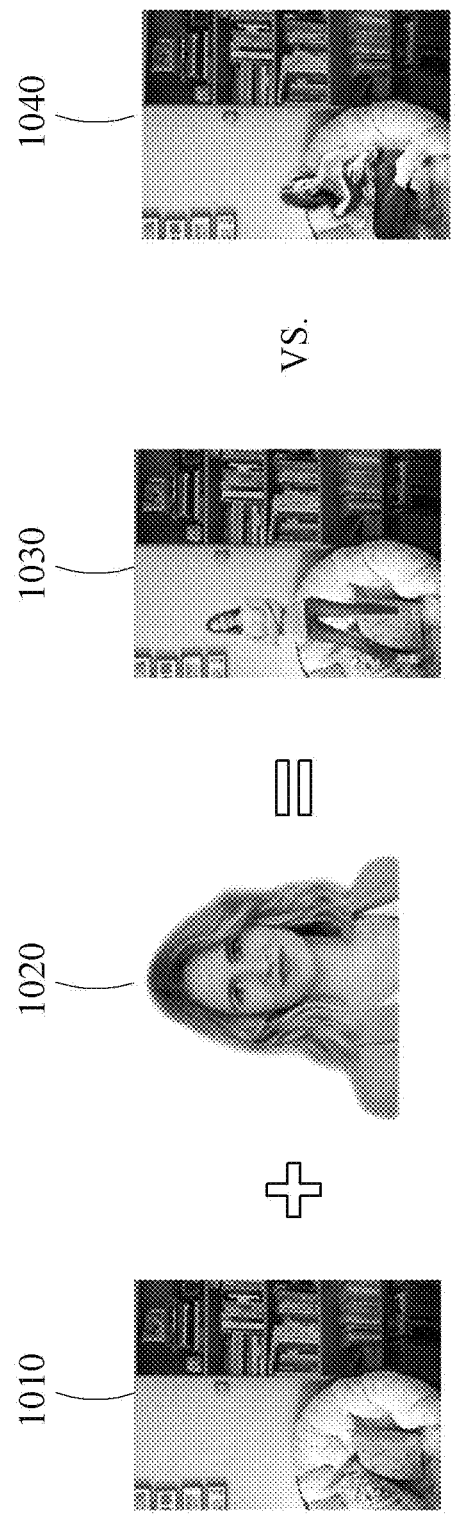
FIG. 10 illustrates an example of generating a virtual object based on obtained object information.

FIG. 10 illustrates an example of generating a virtual object based on obtained object information.

Based on a class, a pose, and a relationship of an actual object in a scene, an available position and a pose of a virtual object to be added to the scene, and a relationship of the virtual object with other objects around the virtual object may be predicted. Through this, the added virtual object may interact with surroundings more realistically and naturally.

For example, in a case in which there is a bookshelf next to a chair in an actual scene and an AR system adds a virtual character to the scene, a virtual character sitting on the chair and reading a book may be generated for natural interaction with the actual scene. For another example, in a case in which there is a chair facing towards a table on which a laptop is placed in an actual scene, a virtual character may be one that uses the computer on the table while sitting on the chair. For another example, in a case in which a chair faces towards a TV with a table behind, a virtual character may be one that watches the TV while sitting on the chair. As described above, based on a class, a pose, and a relationship of an actual object in an actual scene, an available position, pose, and action of a virtual object may be estimated. Based on such an estimated result, natural interaction between virtuality and reality may be implemented.

Referring to FIG. 10, when adding a virtual object 1020 to an actual scene 1010, the virtual object 1020 standing on a sofa as shown in a first case 1030 may be unnatural in connection with actual objects included in the actual scene 1010. Using object information (e.g., a sofa next to a bookshelf) recognized from the actual scene 1010, it is possible to add the virtual object 1020 reading a book on the sofa as shown in a second case 1040. It is thus possible to generate a scene that is more realistic and naturally combined with the actual objects. The generation of a virtual object will be described in detail with the accompanying drawings.

Figure 11:
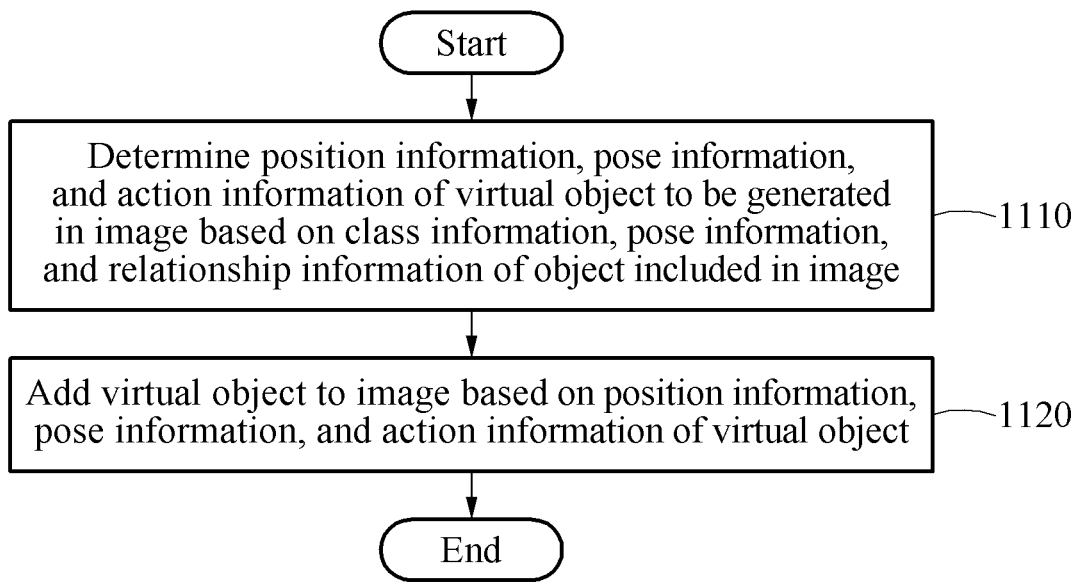
FIG. 11 illustrates an example of generating a virtual object in an image by an electronic device.

FIG. 11 illustrates an example of generating a virtual object in an image by an electronic device.

FIG. 11 is a flowchart illustrating an example of a method of generating a virtual object by a processor included in an electronic device.

Referring to FIG. 11, in operation 1110, the electronic device determines position information, pose information, and action information of a virtual object that a user desires to generate in an image, based on object information, including class information, pose information, and relationship information of an object included in the image. For example, the electronic device may input the object information to a rendering prediction network, and obtain the position information, the pose information, and the action information of the virtual object to be rendered in the image. For the convenience of description, the position information, the pose information, and the action information of the virtual object may also be referred to as virtual object information in a collective term.

The position information of the virtual object may indicate an available position in the image at which the virtual object is to be rendered. The pose information of the virtual object may indicate a rotation angle of the virtual object. The action information of the virtual object may indicate an action performed by the virtual object. The virtual object may include a virtual character or a virtual body, for example. Using the predicted position, pose, and action information when rendering a virtual object in an image, it is possible to obtain a more realistic and natural scene.

The rendering prediction network may include three sub-networks that predict position information, pose information, and action information of a virtual object, respectively. The three sub-networks may include a position regression network, a pose prediction network, and a candidate action network.

The position regression network may use an object feature as an input, and predict an appropriate position of the virtual object through a convolutional layer, a pooling layer, and a fully-connected layer. The pose prediction network may be a regression network used to estimate a 3D pose of the virtual object in a corresponding scene. The candidate action network may predict a relationship of the virtual object with other objects around and output a scene graph, including the virtual object and actual objects.

In operation 1120, the electronic device adds the virtual object to the image based on the position information, the pose information, and the action information of the virtual object.

The position information of the virtual object obtained from the rendering prediction network may include at least one position. In addition, the pose information of the virtual object may include a different pose of the virtual object at each position. In addition, the action information of the virtual object may include at least one action of the virtual object. For example, in a case in which various positions, poses, and actions are predicted, the user may select one position, pose, and action from among the predicted positions, poses, and actions, and render the virtual object in the image based on the selected position, pose, and action.

In an example, when class information, pose information, and relationship information of a recognized actual object are input before the rendering prediction network, by obtaining position information, pose information, and action information of a virtual object that may be rendered in a corresponding image, it is possible to generate the virtual object that naturally interacts with the actual object based on a class, a position, and a relationship of the actual object in the image.

The three sub-networks in the rendering prediction network may be connected to or combined with one another, and used to correct other information through the exchange of respective information in a process of predicting position information, pose information, and action information of a virtual object. Through this, it is possible to obtain a virtual object that interacts with an actual object more naturally.

Figure 12:
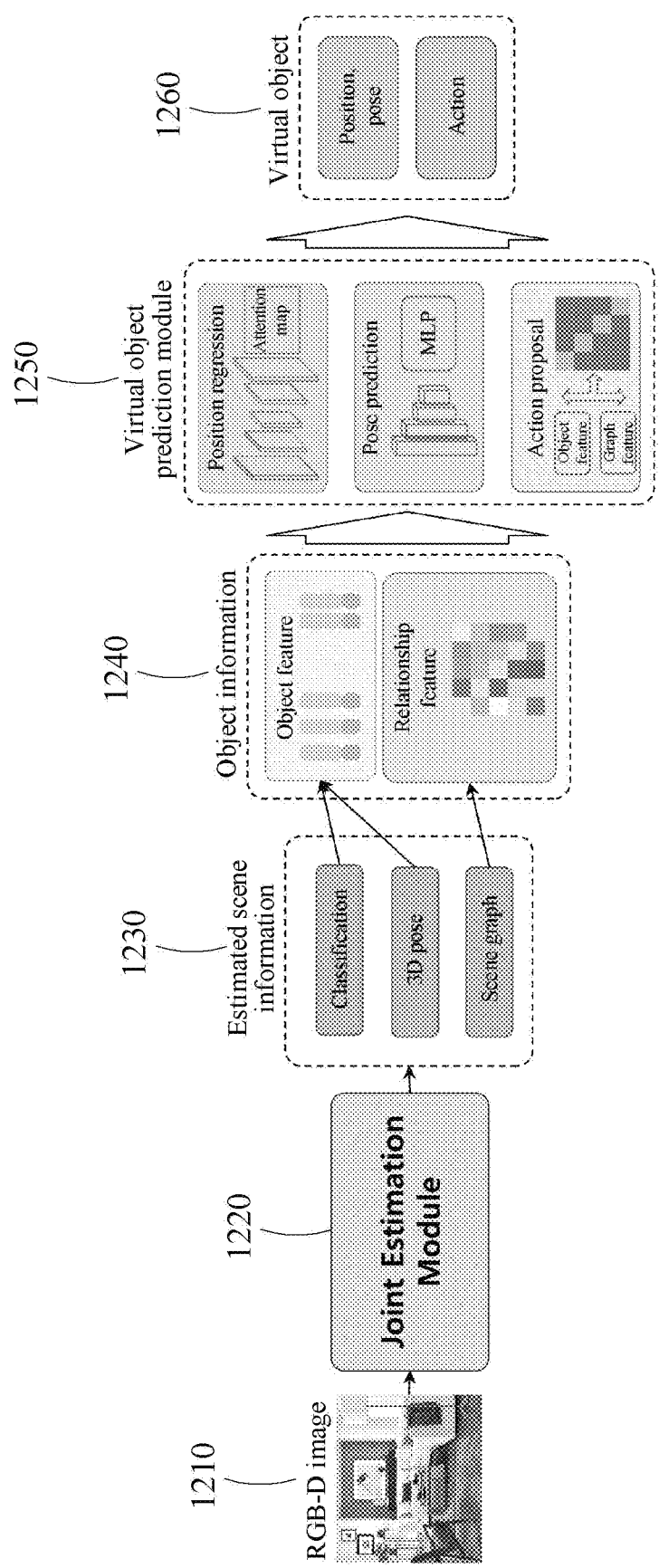
FIGS. 12 through 14 illustrate examples of generating a virtual object by estimating information of an object included in an image.
Figure 13:
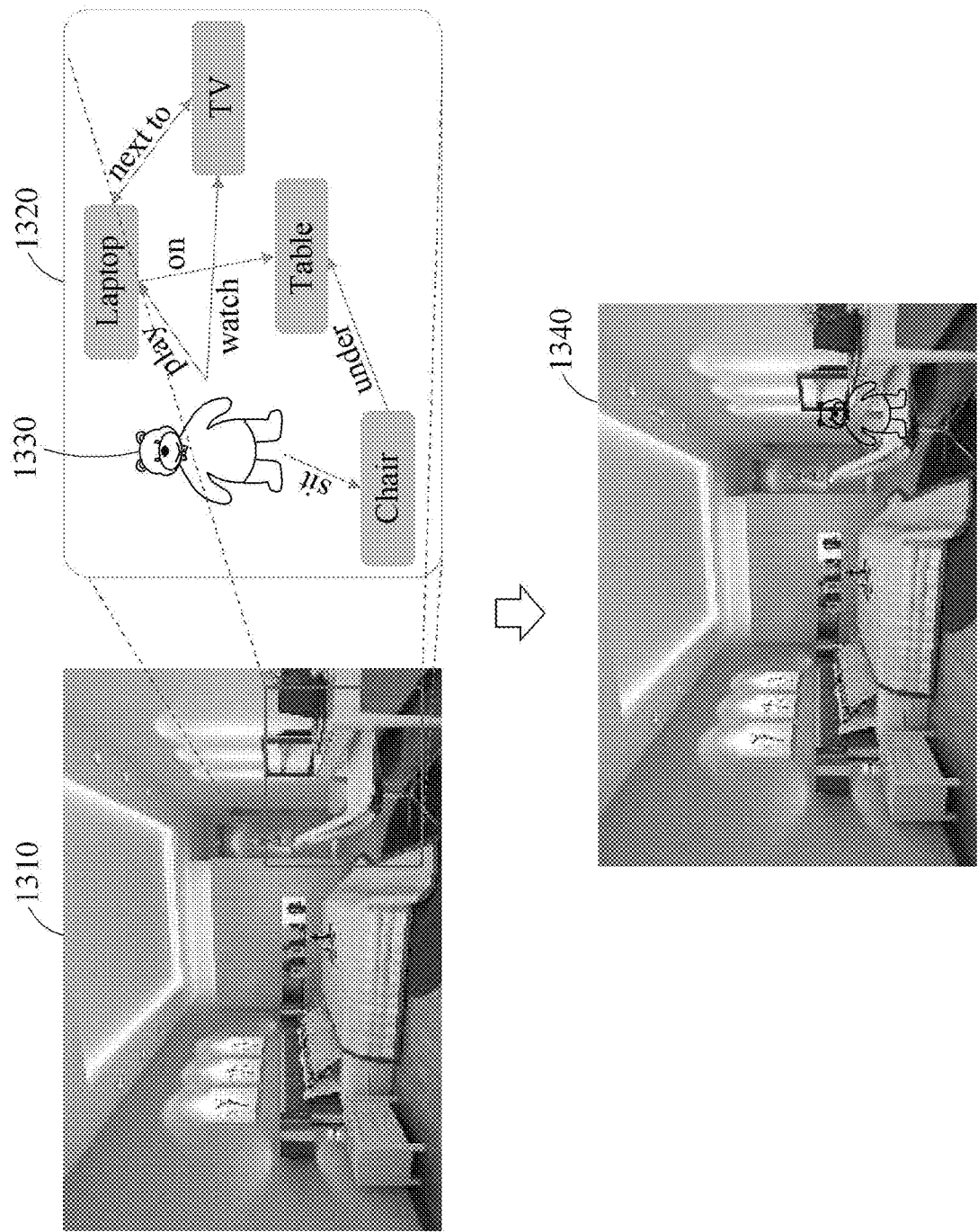
Figure 14:
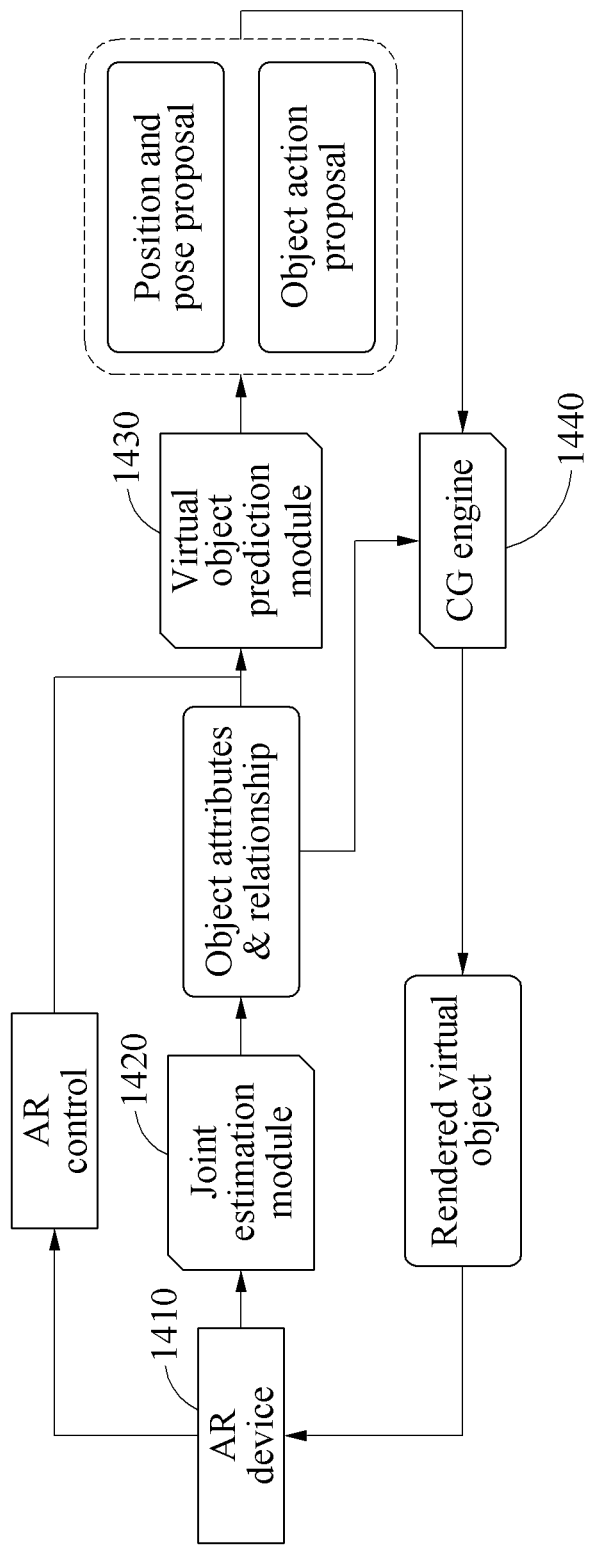

FIGS. 12 through 14 illustrate examples of generating a virtual object by estimating information of an object included in an image.

FIG. 12 illustrates an example of extracting object information from an input image and adding a virtual object to the image based on the extracted object information. Referring to FIG. 12, an electronic device obtains an RGB-D image 1210, which is a color image including a depth image. The electronic device inputs the RGB-D image 1210 to a joint estimation module 1220 and estimates object information 1230 of an object included in the RGB-D image 1210. For example, the joint estimation module 1220 outputs, the estimated object information 1230 (or estimated scene information as illustrated), an object classification result, a 3D pose of the object, and a scene graph, and then obtains object information 1240 including class, pose, and relationship information of the object based on the output. The object information 1240 is input to a virtual object prediction module 1250, and then position information, pose information, and action information of a virtual object 1260 that is to be rendered in the RGB-D image 1210 are obtained. The virtual object prediction module 1250 may also be referred to as a rendering prediction network.

Hereinafter, a method of training the rendering prediction network will be described. A remaining scene portion from which a preset object is excluded may be obtained from each of a plurality of sample images for training the rendering prediction network. The rendering prediction network may be trained such that, when class information, pose information, and relationship information of an object in the remaining scene portion are input, position information, pose information, and action information of the preset object are output.

For example, in a case in which there is a human sitting on a chair in a sample image, by classifying the chair and the human, and obtaining attribute information of the chair and relationship information associated with a relationship between the chair and a floor, and by obtaining position information, pose information, and action information of the human, the rendering prediction network may be trained such that, when the attribute information of the chair and the relationship information associated with the relationship between the chair and the floor are input, the position information, the pose information, and the action information of the human are output.

To implement the foregoing, training data may be generated as follows. For example, an image including a human may be selected from an existing image set, and class information, pose information, and relationship information of a preset object (that is, the human) may be extracted from the selected image through a joint estimation module. In this example, object information of the human may be separated from other information and then be used as true training data, and other object information may be used as input training data.

FIG. 13 illustrates an example of rendering a virtual object in an image. Referring to FIG. 13, class information, pose information, and relationship information of an actual object included in an image 1310 are obtained. In a case in which an electronic device adds a virtual object 1330 to the image 1310, the electronic device may obtain information of objects included in the image 1310 through a joint estimation module. Using such object information, the electronic device predicts an available position at which the virtual object 1330 is to be rendered, and a pose of the virtual object 1330 and a relationship 1320 of the virtual object 1330 with actual objects nearby. Based on such a prediction result, an image 1340 in which the virtual object 1330 is naturally rendered is obtained.

Referring to FIG. 14, an AR device 1410 captures an RGB-D image. A joint estimation module 1420 estimates class information, pose information, and relationship information of each of one or more objects in the image obtained from the AR device 1410. When the AR device 1410 receives a rendering instruction (that is, a control instruction) for a virtual object from a user or a designer, the class information, the pose information, and the relationship information are input to a virtual object prediction module 1430. Then, position information, pose information, and action information of the virtual object to be rendered in the image are output. A CG engine 1440 renders the virtual object in the image based on the position information, the pose information, and the action information of the virtual object.

Figure 15:
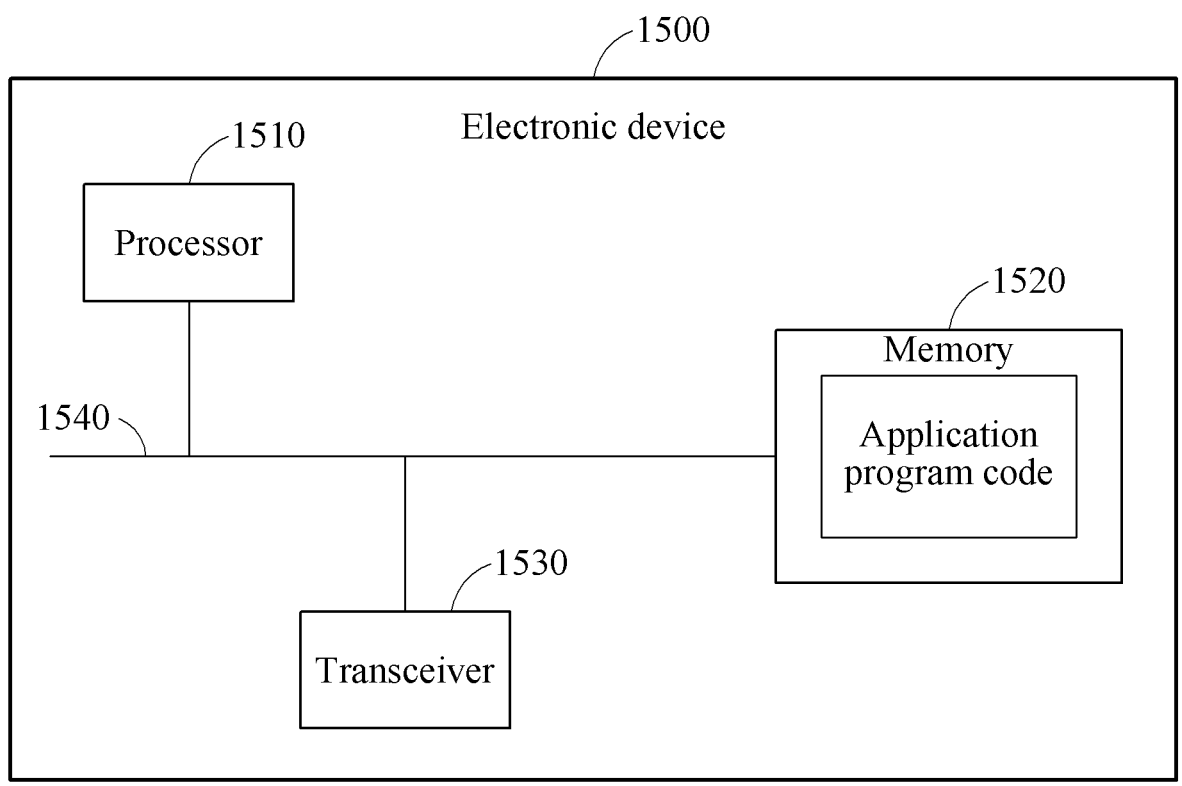
FIG. 15 illustrates an example of an electronic device.

FIG. 15 illustrates an example of an electronic device.

Referring to FIG. 15, an electronic device 1500 includes a processor 1510 and a memory 1520. The electronic device 1500 may selectively include a transceiver 1530. The processor 1510, the memory 1520, and the transceiver 1530 may be connected to one another through a bus 1540. The electronic device 1500 may include, for example, various computing devices such as a smartphone, a personal computer (PC), a tablet PC, and a laptop, various wearable devices such as a smart watch, smart eyeglasses, and smart clothes, various home appliances such as a smart speaker, a smart TV, and a smart refrigerator, and other devices such as a smart vehicle, a smart kiosk, an Internet of things (IoT) device, a walking assist device (WAD), a drone, and a robot.

The processor 1510 may be, for example, a central processing unit (CPU), a general processor, a digital signal processor (DSP), an application-specific integrated circuit (ASIC), a field-programmable gate array (FPGA) or another program-enable logic device, a transistor logic device, a hardware component, or a combination thereof. This may be implemented or executed by combining various example logic blocks, modules, and circuits described herein. The processor 1510 may also be, for example, a combination that realizes a computing function, for example, a combination of one or more microprocessors and a combination of a DSP and a microprocessor.

The memory 1520 may be, for example, a read-only memory (ROM) or another type of a static storage device that stores static information and instructions, a random-access memory (RAM) or another type of a dynamic storage device that stores information and instructions, an electrically erasable programmable ROM (EEPROM), a compact disc ROM (CD-ROM) or another optical disc storage device, an optical disc storage device (e.g., a compact disc, a laser disc, an optical disc, a universal digital optical disc, a blue-ray disc, etc.), a disc storage medium, a magnetic storage device, or other media that is used to carry therewith or store therein a desired program code in a form of an instruction or data and is accessible by a computer. However, examples of which are not limited to the foregoing.

The memory 1520 may be used to store an application program code for performing the operations described above, and its execution may be controlled by the processor 1510. The processor 1510 may execute the application program code stored in the memory 1520 and use it to implement or perform the operations described above.

The bus 1540 may include a path through which information is transferred between components. The bus 1540 may be, for example, a peripheral component interconnect (PCI) bus, an extended industry standard architecture (EISA) bus, or the like. The bus 1540 may be classified into an address bus, a data bus, and a control bus. Although a single bold line is used in FIG. 15 to illustrate the bus 1540 for the convenience of description, the illustration does not indicate that there is only one bus or there is only a single bus type.

The electronic device 1500 may also process or perform the operations described herein.

The electronic device 100, 1500, processor 1510, memory 1520, transceiver 1530, electronic device, and other devices, apparatuses, units, modules, and components described herein with respect to FIGS. 1, 6, 14, and 15 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-15 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EE-PROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A method of operating an electronic device, comprising:
    obtaining an image;
    extracting a class feature, a pose feature, and a relationship feature of an object included in the image;
    correcting each of the class feature, the pose feature, and the relationship feature using any combination of any two or more of the class feature, the pose feature, and the relationship feature of the object;
    extracting class information, pose information, and relationship information of the object based on the corrected class feature, the corrected pose feature, and the corrected relationship feature, respectively; and
    predicting virtual object information, using a rendering prediction network, based on at least one of the class information, the pose information, or the relationship information, where the predicted virtual object information represents a relationship between a virtual object and surrounding objects, including the object, in the image to render the virtual object on the image for interaction with the surrounding objects,
    wherein the predicting of the virtual object information further comprises predicting virtual position information, virtual pose information, and virtual action information of the virtual object to be rendered on the image based on the class information, the pose information, and the relationship information of the object.

2. The method of claim 1, wherein the correcting comprises:
    correcting one of the class feature, the pose feature, and the relationship feature by applying a preset weight to each of the class feature, the pose feature, and the relationship feature of the object.

3. The method of claim 1, wherein the extracting of the class feature, the pose feature, and the relationship feature comprises:
    extracting the class feature, the pose feature, and the relationship feature from respective intermediate layers of sub-networks of a neural network respectively corresponding to the class feature, the pose feature, and the relationship feature.

4. The method of claim 3, wherein the intermediate layers of the sub-networks are connected to one another, and the class feature, the pose feature, and the relationship feature are shared by the sub-networks that are different from one another.

5. The method of claim 1, wherein the extracting of the class information, the pose information, and the relationship information of the object comprises:
    when the corrected class feature, the corrected pose feature, and the corrected relationship feature are input to respective subsequent layers of respective intermediate layers of sub-networks of a neural network respectively corresponding to the corrected class feature, the corrected pose feature, and the corrected relationship feature, extracting the class information, the pose information, and the relationship information from respective output layers of the corresponding sub-networks.

6. The method of claim 1,
wherein the class information includes information as to which object is detected in the image,
the pose information includes information indicating a rotation angle of an object detected in the image, and
the relationship information includes action information associated with either one or both of an action of an object detected in the image and connection information associated with a connection with another object.

7. The method of claim 1, wherein the predicting of the virtual object information further comprises:
adding the virtual object to the image based on the virtual position information, the virtual pose information, and the virtual action information.

8. The method of claim 7, wherein the adding of the virtual object comprises:
when at least one of the virtual position information, the virtual pose information, or the virtual action information is a respective plurality of sets of predicted information, adding the virtual object to the image based on information selected by a user from among the respective plurality of sets of the predicted information.

9. The method of claim 7,
wherein the virtual position information includes information indicating a position at which the virtual object is available to be rendered in the image,
the virtual pose information includes information indicating a rotation angle of the virtual object, and
the virtual action information includes information indicating an action of the virtual object.

10. The method of claim 1, wherein the image is a red-green-blue (RGB) depth (D) (RGB-D) image.

11. A non-transitory computer-readable storage medium storing instructions that, when executed by one or more processors, configure the one or more processors to perform the method of claim 1.

12. An electronic device comprising:
one or more processors configured to:
obtain an image;
extract a class feature, a pose feature, and a relationship feature of at least one object included in the image;
correct each of the class feature, the pose feature, and the relationship feature using any combination of any two or more of the class feature, the pose feature, and the relationship feature of the at least one object; and
extract class information, pose information, and relationship information of the at least one object based on the corrected class feature, the corrected pose feature, and the corrected relationship feature, respectively; and
predict virtual object information, using a rendering prediction network, based on at least one of the class information, the pose information, or the relationship information, where the predicted virtual object information represents a relationship between a virtual object and surrounding objects, including the object, in the image to render the virtual object on the image for interaction with the surrounding objects,
wherein, for the prediction of the virtual object information, the one or more processors are configured to predict virtual position information, virtual pose information, and virtual action information of the virtual object to be rendered on the image based on the class information, the pose information, and the relationship information of the object.

13. The electronic device of claim 12, wherein, for the correction, the one or more processors are configured to:
correct one of the class feature, the pose feature, and the relationship feature by applying a preset weight to each of the class feature, the pose feature, and the relationship feature of the object.

14. The electronic device of claim 12, wherein, for the extraction of the class feature, the pose feature, and the relationship feature, the one or more processors are configured to:
extract the class feature, the pose feature, and the relationship feature from respective intermediate layers of sub-networks of a neural network respectively corresponding to the class feature, the pose feature, and the relationship feature.

15. The electronic device of claim 14, wherein the intermediate layers of the sub-networks are connected to one another, and the class feature, the pose feature, and the relationship feature are shared by the sub-networks that are different from one another.

16. The electronic device of claim 12, wherein, for the extraction of the class information, the pose information, and the relationship information, the one or more processors are configured to:
when the corrected class feature, the corrected pose feature, and the corrected relationship feature are input to respective subsequent layers of respective intermediate layers of sub-networks of a neural network respectively corresponding to the corrected class feature, the corrected pose feature, and the corrected relationship feature, extract the class information, the pose information, and the relationship information from respective output layers of the corresponding sub-networks.

17. The electronic device of claim 12,
wherein the class information includes information as to which object is detected in the image,
the pose information includes information indicating a rotation angle of an object detected in the image, and
the relationship information includes action information associated with either one or both of an action of an object detected in the image and connection information associated with a connection with another object.

18. The electronic device of claim 12, wherein, for the prediction of the virtual object information, the one or more processors are configured to:
add the virtual object to the image based on the virtual position information, the virtual pose information, and the virtual action information.

19. The electronic device of claim 18, wherein, for the addition of the virtual object to the image, the one or more processors are configured to:
when at least one of the virtual position information, the virtual pose information, or the virtual action information is a respective plurality of sets of predicted information, add the virtual object to the image based on information selected by a user from among the respective plurality of sets of the predicted information.

20. The electronic device of claim 18,
wherein the virtual position information includes information indicating a position at which the virtual object is available to be rendered in the image, the virtual pose information includes information indicating a rotation angle of the virtual object, and the virtual action information includes information indicating an action of the virtual object.

21. The method of claim 1, wherein the extracting of the class feature, the pose feature, and the relationship feature of the object, and the correcting of each of the class feature, the pose feature, and the relationship feature, are performed by implementing a neural network that is provided an input corresponding to the input image.

22. The method of claim 1,
wherein the extracting of the class feature, the pose feature, and the relationship feature of the object, the correcting of each of the class feature, the pose feature, and the relationship feature, and/or the extracting of the class information, the pose information, and the relationship information are performed using one or more neural networks that are respectively provided an input corresponding to the input image, and
wherein the extracting of the class feature, the correcting of the class feature, and the extracting of the class information are performed in parallel with the extracting of the pose feature, the correcting of the pose feature, and the extracting of the pose information, and in further parallel with the extracting of the relationship feature, the correcting of the relationship feature, and the extracting of the relationship information.

23. The method of claim 22, further comprising performing the rendering of the virtual object on the image based on determined virtual position information, virtual pose information, and virtual action information, dependent on the class information, the pose information, and the relationship information of the object.

24. The method of claim 5, wherein the extracting of the class feature, the pose feature, and the relationship feature comprises:
extracting the class feature, the pose feature, and the relationship feature from respective preceding intermediate layers of the respective sub-networks based on the image provided to the neural network, where the preceding intermediate layers each respectively precede the corresponding layer of the respective sub-networks.

25. The method of claim 1, wherein the virtual object information includes predicted virtual position information, corresponding to an available position in the image, and predicted virtual action information of the virtual object.

* * * * *